(12) United States Patent
Ikeda et al.

(10) Patent No.: US 9,892,819 B2
(45) Date of Patent: Feb. 13, 2018

(54) INSULATED WIRE, COIL, AND ELECTRONIC/ELECTRICAL EQUIPMENT

(71) Applicants: FURUKAWA ELECTRIC CO., LTD., Tokyo (JP); FURUKAWA MAGNET WIRE CO., LTD., Tokyo (JP)

(72) Inventors: Keisuke Ikeda, Tokyo (JP); Makoto Oya, Tokyo (JP); Hideo Fukuda, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 0 days.

(21) Appl. No.: 15/192,175

(22) Filed: Jun. 24, 2016

(65) Prior Publication Data

US 2016/0307662 A1    Oct. 20, 2016

Related U.S. Application Data (63) Continuation of application No. PCT/JP2014/083366, filed on Dec. 17, 2014.

(30) Foreign Application Priority Data

Dec. 26, 2013  (JP) ................. 2013-270574

(51) Int. Cl.
*H01B 3/30* (2006.01)
*H01F 5/06* (2006.01)
(Continued)

(52) U.S. Cl.
CPC ............ *H01B 3/30* (2013.01); *C09D 171/00* (2013.01); *H01B 3/307* (2013.01); *H01B 3/308* (2013.01); *H01B 3/427* (2013.01); *H01F 5/06* (2013.01)

(58) Field of Classification Search
USPC ................................................ 170/120 R
See application file for complete search history.

(56) References Cited

U.S. PATENT DOCUMENTS 5,358,786 A * 10/1994 Ishikawa ............... H01B 3/30
                                                    174/110 AR
5,393,929 A *  2/1995 Yagihashi ............ B32B 27/08
                                                    174/102 R
(Continued)

FOREIGN PATENT DOCUMENTS

JP    2005-203334 A     7/2005
JP    2005203334 A *    7/2005
(Continued)

OTHER PUBLICATIONS

International Search Report (PCT/ISA/210) issued in PCT/JP2014/083366, dated Mar. 10, 2015.
(Continued)

*Primary Examiner* — William H Mayo, III
*Assistant Examiner* — Krystal Robinson
(74) *Attorney, Agent, or Firm* — Birch, Stewart, Kolasch & Birch, LLP (57) ABSTRACT

An insulated wire, having a thermosetting resin covering (A), directly or by interposing an insulating layer (C), on a conductor having a rectangular cross-section, and a thermoplastic resin covering (B) on a periphery of the thermosetting resin covering (A), wherein the thermoplastic resin covering (B) has at least two layers of the thermoplastic resin layers, and the thermoplastic resin layers adjacent to each other are formed of thermoplastic resins different from each other, at least one layer of the thermoplastic resin layers is formed of polyether ether ketone or modified polyether ether ketone, and a total thickness of the thermoplastic resin layers is 60 to 120 μm, and a thickness of a thinnest
(Continued)

thermoplastic resin layer is 5 to 20 μm; and a coil formed by winding processing the insulated wire and an electrical equipment having the coil.

9 Claims, 1 Drawing Sheet

(51) Int. Cl.
*H01B 3/42* (2006.01)
*C09D 171/00* (2006.01)

(56) References Cited

U.S. PATENT DOCUMENTS

| | | | | |
|---|---|---|---|---|
| 6,403,889 | B1* | 6/2002 | Mehan | B32B 1/08 |
| | | | | 174/120 R |
| 6,617,515 | B1* | 9/2003 | Yeung | B29C 47/0004 |
| | | | | 174/110 FC |
| 8,569,628 | B2* | 10/2013 | Abe | H01B 3/301 |
| | | | | 174/120 R |
| 2011/0226508 | A1* | 9/2011 | Aoi | C08L 81/02 |
| | | | | 174/120 SR |
| 2012/0285724 | A1* | 11/2012 | Oya | H01B 3/306 |
| | | | | 174/120 C |

FOREIGN PATENT DOCUMENTS

| | | |
|---|---|---|
| JP | 2009-245652 A | 10/2009 |
| JP | 4904312 B2 | 3/2012 |
| JP | 5306742 B2 | 10/2013 |

OTHER PUBLICATIONS

Written Opinion (PCT/ISA/237) issued in PCT/JP2014/083366, dated Mar. 10, 2015.

* cited by examiner

INSULATED WIRE, COIL, AND ELECTRONIC/ELECTRICAL EQUIPMENT

CROSS-REFERENCE TO RELATED APPLICATIONS

This application is a continuation of PCT/JP2014/083366 filed on Dec. 17, 2014 which claims benefit of Japanese Patent Application No. 2013-270574 filed on Dec. 26, 2013, the subject matters of which are incorporated herein by reference in their entirety.

TECHNICAL FIELD

The present invention relates to an insulated wire, a coil, and electronic/electrical equipment.

BACKGROUND ART

In coils for electronic or electrical equipment such as inverter-related equipment, for example, high-speed switching devices, inverter motors and transformers, electrical insulated wires (insulated wires), which are enameled wires, are mainly used as magnet wires. It is required for insulated wires to minimize partial discharge deterioration, which is attributable to inverter surge. In order to prevent the partial discharge deterioration, studies have been conducted on methods of increasing a partial discharge inception voltage, and one of them includes a method of increasing a thickness of an insulation covering of the insulated wire. However, in the case where the thickness of the insulation covering is increased, adhesion with the conductor is reduced.

Therefore, attempts have been made on pursing high value-added properties based on a newly provided covering resin layer, in addition to increasing the partial discharge inception voltage, by providing, as a multilayer insulation covering, the covering resin layer formed of a resin having properties different from those of an enamel-baked layer outside the enamel-baked layer. For example, Patent Literature 1 proposes "inverter surge-resistant insulated wire capable of realizing achievement of a thick film of an insulating layer for increasing partial discharge inception voltage without decreasing adhesive force between a conductor of an insulated wire and an enameled layer" by providing a multilayer insulation covering. Moreover, Patent Literature 2 proposes an insulated wire having a high partial discharge inception voltage, and excellent abrasion resistance of a coating, and the like by providing a multilayer insulation covering.

CITATION LIST

Patent Literatures

Patent Literature 1: Japanese Patent No. 4904312
Patent Literature 2: Japanese Patent No. 5306742

SUMMARY OF INVENTION

Technical Problem

Advance of the electronic or electrical equipment (also referred to as electrical or electronic equipment, or electronic equipment) represented by rotating electric machines or transformers, has been progressed resulting in size reduction and improved performance. Thus, it becomes usual in many cases that insulated wires are used in such a way that the insulated wires are processed by winding (coil processing) and they are pushed into a quite small space to pack. In this way, it is no exaggeration to say that the performance of a rotating electric machine, such as a motor, is determined by how many coils produced by coil processing the insulated wires into a coil shape can be held in a stator slot. As a result, improvement of the ratio of the sectional area of conductors to the sectional area of the stator slot (space factor described below) has been required to be particularly highly increased. For the reasons discussed above, it has been lately attempted to use a rectangular wire in which the conductor has a cross-sectional shape similar to a quadrilateral (square or rectangle), as a means for increasing the space factor.

Moreover, in each field in which the rotating electric machine is utilized, a working voltage has become high by achievement of high efficiency of the rotating electric machine, and heat dissipation performance cannot be sufficiently secured by achievement of size reduction, and the like in several cases. Accordingly, a demand on heat resistance in addition to electrical properties increasingly grows for the insulated wires. In particular, sufficient insulation performance has been required even after the insulated wire is momentarily or intermittently exposed under a temperature higher than a designed level.

Further, the insulation covering is easily scratched, and the insulated wires are repeatedly scraped with each other at a high speed during processing from the insulated wire into a coil in several cases, and therefore scratch resistance performance (also referred to as scratch resistance) is also required.

In the meantime, a demand has recently increasingly grown for achievement of size reduction, weight reduction, high performance of the electrical equipment, and the like. Moreover, development has rapidly progressed on HV (hybrid vehicle) or EV (electric vehicle) in which the rotating electric machine is utilized as a driving motor. In order to respond to such rapid progress of achievement of high performance and the like, development of specific performance and improvement of a demand level, the conventional technologies have been far from satisfactory yet.

In the conventional technologies, it becomes further important to achieve improvement of the above-described properties and reduction of a space factor.

Accordingly, the present invention is contemplated for providing an insulated wire without adversely affecting withstand voltage properties even if the thickness of insulation covering is small, and having excellent heat resistance and scratch resistance, a coil and electrical equipment using this insulated wire.

Solution to Problem

The present inventors diligently continued to conduct study on structure of a multilayer insulation covering, a kind of resin and the like from viewpoints of withstand voltage properties and achievement of size reduction of an insulated wire. As a result, the present inventors found that a covering of a thermoplastic resin (referred to as a thermoplastic resin covering) is formed into a double-layered structure in which thermoplastic resin layers formed of the different thermoplastic resins are laminated, and one layer thereof is thinned to a specific thickness are important for the withstand voltage properties per unit thickness of the thermoplastic resin covering. Furthermore, the present inventors found that, in the case where one layer (the layer may be the same as or different from the layer thinned to the above-described specific thickness) that constitutes the thermoplastic resin covering is formed by a specific resin, heat resistance and scratch resistance, in addition to improvement of the withstand voltage properties, can also be improved, and properties required for the insulated wire for the electrical equipment in which the size reduction and high performance have been recently achieved can be satisfied. The present invention has been made based on those findings.

The above-described problems of the present invention can be solved by the following means.

(1) An insulated wire, having a thermosetting resin covering (A), directly or by interposing an insulating layer (C), on a conductor having a rectangular cross-section, and a thermoplastic resin covering (B) on a periphery of the thermosetting resin covering (A), wherein the thermoplastic resin covering (B) has at least two layers of the thermoplastic resin layers, and the thermoplastic resin layers adjacent to each other are formed of thermoplastic resins different from each other, at least one layer of the thermoplastic resin layers is formed of polyether ether ketone or modified polyether ether ketone, and a total thickness of the thermoplastic resin layers is 60 to 120 μm, and a thickness of a thinnest thermoplastic resin layer among the thermoplastic resin layers is 5 to 20 μm.

(2) The insulated wire described in the above item (1), wherein an outermost layer of the thermoplastic resin covering (B) is a thermoplastic layer formed of the polyether ether ketone or the modified polyether ether ketone.

(3) The insulated wire described in the above item (1) or (2), wherein the thermoplastic resin covering (B) is formed of two layers of the thermoplastic resin layers.

(4) The insulated wire described in any one of the above items (1) to (3), wherein the thinnest thermoplastic resin layer is provided inside the thermoplastic resin layer formed of the polyether ether ketone or the modified polyether ether ketone.

(5) A coil formed by winding processing the insulated wire described in any one of the above items (1) to (4).

(6) Electronic/electrical equipment, having the coil described in the above item (5).

In the present invention, "layer formed of resin" means the layer is formed of the resin, and referred to as "resin layer."

Moreover, in the present invention, "conductor having rectangular cross-section" includes both a conductor having a quadrate cross-section and a conductor having a square cross-section in the meaning.

Advantageous Effects of Invention

The present invention enables to provide an insulated wire without adversely affecting withstand voltage properties even if the thickness of insulation covering is small, and having excellent heat resistance and scratch resistance, a coil and electrical equipment using this insulated wire.

In the insulated wire of the present invention, the withstand voltage properties per unit thickness of a thermoplastic resin covering (B) are improved. Thus, when the withstand voltage properties required for the electrical equipment are satisfied, the thermoplastic resin covering (B) can be further thinned in comparison with conventional insulated wires. Accordingly, a space factor of the insulated wire according to the present invention to be assembled into the electrical equipment can be reduced. Moreover, the insulated wire of the present invention has improved heat resistance and scratch resistance, and simultaneously has all of the withstand voltage properties, the heat resistance and the scratch resistance at a high level. Accordingly, further size reduction and high performance of the electrical equipment can be achieved by using the insulated wire of the present invention in the form of a coil.

Other and further features and advantages of the invention will appear more fully from the following description, appropriately referring to the accompanying drawings.

MODE FOR CARRYING OUT THE INVENTION

<<Insulated Wire>>

An insulated wire of the present invention has a conductor, a thermosetting resin covering (A) provided on the conductor directly or by interposing an insulating layer (C), and a thermoplastic resin covering (B) provided on a periphery of the thermosetting resin covering (A).

The thermoplastic resin covering (B) has at least two layers of the thermoplastic resin layers.

At least two layers of the thermoplastic resin layers satisfy the following (1) to (4):

(1) thermoplastic resin layers adjacent to each other are formed of thermoplastic resins different from each other;

(2) at least one layer of the thermoplastic resin layers is formed of polyether ether ketone or modified polyether ether ketone;

(3) a total thickness of the thermoplastic resin layers is 60 to 120 μm; and (4) a thickness of a thinnest thermoplastic resin layer among the thermoplastic resin layers is 5 to 20 μm.

In the present invention, the insulating layer (C) and the thermosetting resin covering (A) may be one layer or may be formed of a plurality of layers including two or more layers, respectively.

In the present invention, in the case where the layers in which the resins constituting (forming) the layers and additive contained are completely the same are laminated adjacent to each other, such layers are counted as one layer in all.

On the other hand, in the case where even the layers in which the resins constituting (forming) the layers and the additives contained are completely the same are not laminated adjacent to each other, namely in the case where the layers are laminated by interposing any other layer, each layer is counted as one layer. For example, the thermoplastic resin covering (B) is counted as three layers in Example 4.

Moreover, in the case where the layers in which the layers are formed of the same resin, but kinds of additives or amounts of compounding of the additives are different are laminated, each layer is counted as one layer, regardless of whether or not the layers are adjacent to each other.

Hereinafter, preferable embodiments of the insulated wire of the present invention will be explained, with reference to the drawings. But the present invention is not meant to be limited by these.

Figure 1:
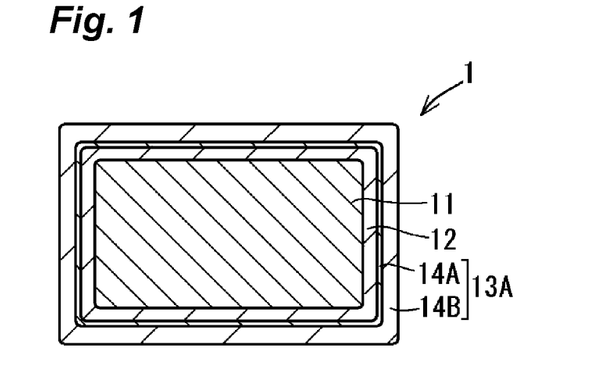
FIG. 1 is a schematic cross-sectional view showing a preferred embodiment of the insulated wire of the present invention.

A preferred insulated wire 1, a cross-sectional view of which is shown in FIG. 1 according to the present invention has a conductor 11, a thermosetting resin covering 12 provided on outer periphery of the conductor 11, and a thermoplastic resin covering 13A provided on outer periphery of the thermosetting resin covering 12. The thermosetting resin covering 12 has a single-layered structure formed of thermosetting resin layer. The thermoplastic resin covering 13A has a double-layered structure formed of a thermoplastic resin layer 14A provided on outer periphery of the thermosetting resin covering 12, and a thermoplastic resin layer 14B provided on outer periphery of the thermoplastic resin layer 14A. A thickness of the thermoplastic resin layer 14A is formed at a thickness smaller in comparison with the thermoplastic resin layer 14B.

Figure 2:
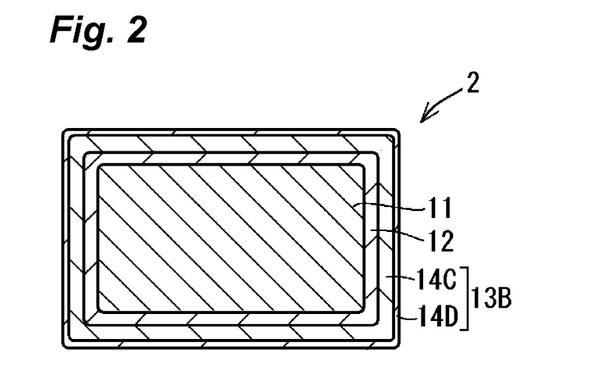
FIG. 2 is a schematic cross-sectional view showing another preferred embodiment of the insulated wire of the present invention.

A preferred insulated wire 2, a cross-sectional view of which is shown in FIG. 2 according to the present invention is the same as the insulated wire 1 except that a formed position of the thermoplastic resin layer is different. That is, the insulated wire 2 has a conductor 11, a thermosetting resin covering 12 and a thermoplastic resin covering 13B. The thermoplastic resin covering 13B has a double-layered structure formed of a thermoplastic resin layer 14C provided on an outer periphery of the thermosetting resin covering 12, and a thermoplastic resin layer 14D provided on an outer periphery of the thermoplastic resin layer 14C. A thickness of the thermoplastic resin layer 14D is formed at a thickness smaller in comparison with the thermoplastic resin layer 14C.

Figure 3:
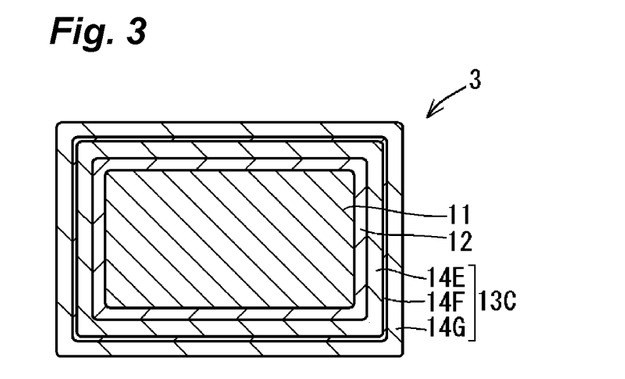
FIG. 3 is a schematic cross-sectional view showing still another preferred embodiment of the insulated wire of the present invention.

A preferred insulated wire 3, a cross-sectional view of which is shown in FIG. 3 according to the present invention is the same as the insulated wire 1 except that thermoplastic resin covering (B) is different. That is, the insulated wire 3 has a conductor 11, a thermosetting resin covering 12 and a thermoplastic resin covering 13C. The thermoplastic resin covering 13C has a triple-layered structure formed of a thermoplastic resin layer 14E provided on an outer periphery of the thermosetting resin covering 12, a thermoplastic resin layer 14F provided on an outer periphery of the thermoplastic resin layer 14E, and a thermoplastic resin layer 14G provided on an outer periphery of the thermoplastic resin layer 14F. The thermoplastic resin layer 14F is the thinnest thermoplastic resin layer among the three layers, and a thickness of the thermoplastic resin layer 14E and a thermoplastic resin layer 14G may be equal to or larger in either one.

In the present invention, although not shown, the insulating layer (C) can also be provided between the conductor 11 and the thermosetting resin covering 12 in the insulated wires 1 to 3.

Hereinafter, the insulated wire of the present invention is described in order from a conductor.

<Conductor>

As the conductor used in the present invention, use may be made of any conductor that is usually used in insulated wires and examples thereof include a metal conductor such as a copper wire and an aluminum wire. The conductor is a conductor of preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

A conductor used in the present invention is the conductor whose cross-sectional shape is rectangular. The rectangular conductor has higher space factor with respect to the stator slot at the time of winding, compared to a round conductor. Accordingly, the rectangular conductor is preferably used for this purpose.

In view of suppressing a partial discharge from a corner portion, the rectangular conductor has preferably such a shape that chamfered edges (curvature radius r) are provided at four corners as shown in FIGS. 1 to 3. The curvature radius r is preferably 0.6 mm or less and more preferably in a range from 0.2 to 0.4 mm.

The size of the conductor is not particularly limited, but the width (long side) thereof is preferably from 1 to 5 mm, and more preferably from 1.4 to 4.0 mm, and the thickness (short side) is preferably from 0.4 to 3.0 mm, and more preferably from 0.5 to 2.5 mm. The ratio of length of the width (long side) to the thickness (short side) is preferably from 1:1 to 4:1.

<Thermosetting Resin Covering (A)>

In the present invention, the thermosetting resin covering (A) 12 is provided on the conductor as an enamel-baked layer. This thermosetting resin covering (A) has at least one layer of the thermosetting resin layer formed of a thermosetting resin. In the case where the thermosetting resin covering (A) is formed of one layer of the thermosetting resin layer, the thermosetting resin covering (A) and the thermosetting resin layer are synonymous.

The enamel-baked layer is formed by coating and baking a resin varnish on a conductor. The enamel-baked layer may be formed directly on the outer periphery of the conductor, or may be formed by interposing, for examples, an insulating layer (C) described below.

A varnish used contains a thermosetting resin.

The thermosetting resin is a thermosetting resin capable of forming an insulating film by coating and baking it on a conductor. Examples thereof include polyimide (PI), polyurethane, polyamideimide (PAI), a thermosetting polyester (PEst), Class H polyester (HPE), polybenzimidazole, polyesterimide, a melamine resin, and an epoxy resin.

In the present invention, as a thermosetting resin, a thermosetting resin selected from the group consisting of polyimide, polyamideimide, Class H polyester and polyesterimide is particularly preferable.

The polyimide is not particularly limited, but any of polyimide resins such as a whole aromatic polyimide and a thermosetting aromatic polyimide may be used. For example, use may be made of a commercially available product (for example, trade name, U IMIDE, manufactured by Unitika Ltd.; and trade name, U-VARNISH, manufactured by Ube Industries, Ltd.). Or use may be made of polyimides obtained by a usual method in which an aromatic tetracarboxylic dianhydride and aromatic diamines are reacted in a polar solvent to obtain a polyamide acid solution, and then the obtained polyamide acid solution is subjected to imidization by a thermal treatment at the time of baking in formation of the coating.

As the polyamideimide, use may be made of a commercially available product (for example, trade name, HI 406, manufactured by Hitachi Chemical Co., Ltd. and trade name, HCl-series, manufactured by Hitachi Chemical Co., Ltd.). Or use may be made of polyamideimides obtained by a usual method, for example, a method in which a tricarboxylic dianhydride and diisocyanates are directly reacted in a polar solvent, or a method in which diamines are reacted with a tricarboxylic dianhydride in a polar solvent to previously introduce an imide bond to the reaction product, and then the reaction product is subjected to amidation using diisocyanates.

Note that the polyamideimide has the properties of a lower thermal conductivity and a higher dielectric breakdown voltage than other resins, and has bake hardenability.

The Class H polyester means an aromatic polyester resin modified by adding thereto a phenol resin or the like and the heat resistant grade thereof is Class H. Examples of commercially available Class H polyesters include ISONEL200 (trade name, manufactured by Schenectady International Inc.).

Polyesterimide only needs to be a polymer having an ester bond and an imide bond in a molecule, and to be thermosetting, and a commercially available product such as trade name: Neoheat 8600A, manufactured by Toutoku Toryo Co., Ltd., can be used, for example.

Moreover, the polyesterimide is not particularly limited. For example, polyesterimide can be used as obtained by forming the imide bond from tricarboxylic anhydride and amine, forming the ester bond from alcohol and carboxylic acid or alkyl ester thereof, and then a free acid group or an anhydride group of the imide bonding reacting in an ester-forming reaction. As such polyesterimide, polyesterimide can also be used as obtained by allowing tricarboxylic anhydride, a dicarboxylic acid compound or alkyl ester thereof to react with an alcohol compound and a diamine compound by a publicly known method.

Regarding these thermosetting resins, only one kind thereof may be used alone, or more than one kind thereof may be used by mixture. Further, in the case where a thermosetting resin covering (A) is formed of a plurality of thermosetting resin layers, the thermosetting resins which are different from each other in each layer may be used, or thermosetting resins whose mixing ratios are different from each other in each layer may be used.

The resin varnish used in the present invention may contain various kinds of additives or the like, such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, to the extent that the characteristics are not affected. Furthermore, a layer formed from a resin containing these additives may be laminated on the resulting insulated wire, or the insulated wire may be coated with a coating material containing these additives.

A powder having a high aspect ratio such as a glass fiber and a carbon nanotube may be added to a coating material and the obtained varnish may be baked in order to improve a tensile modulus of the thermosetting resin layer. By addition of such powder, the powder is aligned in the flow direction of the wire at the processing, so that the wire is strengthened in the bend direction.

The resin varnish contains an organic solvent and the like so as to make the thermosetting resin be a varnish, the organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; phenol-based solvents such as cresol, phenol, 1.halogenated phenol; sulfone-based solvents such as sulfolane; and dimethylsulfoxide (DMSO).

Of these organic solvents, in view of high solubility, high reaction promotion properties and the like, amide-based solvents and urea-based solvents are preferred; and in view of a solvent without a hydrogen atom that is apt to inhibit a crosslinking reaction due to heating, N-methyl-2-pyrrolidone, N,N-dimethylacetamide, N,N-dimethylethyleneurea, N,N-dimethylpropyleneurea and tetramethylurea are more preferred, and N,N-dimethylformamide and dimethylsulfoxide is particularly preferred.

Regarding the organic solvent and the like, one kind may be used alone, or two or more kinds may be used in mixture.

In order that the number of passages through a baking furnace can be reduced, and adhesion between the conductor and the enamel-baked layer can be prevented from being extremely lowered, the thickness of the enamel-baked layer (the total thickness of the thermosetting layers) is preferably 60 μm or less, and further more preferably 50 μm or less. Further, in order to prevent deterioration of voltage resistance or heat resistance, which are properties required for the enameled wires as insulated wires, it is preferable that the enamel-baked layer has a certain thickness. The lower limit of the thickness of the enamel-baked layer is not particularly limited, as long as it is a thickness where no pinholes are formed. The thickness of the enamel-baked layer is preferably 3 μm or more, more preferably 6 μm or more.

<Thermoplastic Resin Covering (B)>

In the present invention, the thermoplastic resin covering (B) formed of at least two layers of the thermoplastic resin layers is provided, preferably as an extrusion covering, on the thermosetting resin covering (A) being the enamel-baked layer.

An advantage of providing the thermoplastic resin covering (B) as the extrusion covering is to have no necessity of passing the wire through a baking furnace in a production process, and therefore to have a capability increasing the thickness of the thermoplastic resin covering (B) without growing the thickness of an oxide skin layer on the conductor.

In addition, the thermoplastic resin covering (B) can also be provided by applying and baking varnish as in the thermosetting resin layer.

The number of the thermoplastic resin layers that constitute the thermoplastic resin covering (B) is not particularly limited, as long as at least two layers are applied, and is preferably 2 to 4 layers, more preferably 2 layers or 3 layers, and further more preferably 2 layers in view of productivity and cost thereof.

The thermoplastic resin covering (B) has the thinnest thermoplastic resin layer. In the case where the thermoplastic resin covering (B) having a laminated structure has the thinnest thermoplastic resin layer, the withstand voltage properties (electrical performance) per unit thickness of the thermoplastic resin covering (B) is improved in the thermoplastic resin covering (B) as a whole. In particular, in the case where the thickness of the thinnest thermoplastic resin is within the range described later, this effect on improving the withstand voltage properties is high, and the withstand voltage properties can be maintained even if a total thickness of the thermoplastic resin covering (B) is reduced. Accordingly, the total thickness of the thermoplastic resin covering (B) can be reduced, and eventually, diameter reduction of the insulated wire can be achieved without adversely affecting the withstand voltage properties.

In the present invention, the effect on improving the withstand voltage properties per unit thickness of the thermoplastic resin covering (B) can be evaluated in terms of a reduction ratio (merely referred to as a total thickness reduction ratio in several cases) of the total thickness of the thermoplastic resin covering (B) as required for exhibiting specific withstand voltage properties, for example. Here, the total thickness reduction ratio (%) is a proportion $((T_A-T_B)/T_A$ (%)) obtained by dividing, by a thickness $T_A$, a differential $(T_A-T_B)$ between $T_A$, the thickness of a single layer of the thermoplastic resin covering, as required for exhibiting the specific withstand voltage properties, and $T_B$, a total thickness of the thermoplastic resin covering (B) according to the present invention, as required for exhibiting the specific withstand voltage properties. In addition, the conductor 11 and the thermosetting covering (A) 12 are regarded as predetermined.

In the present invention, the total thickness reduction ratio is not particularly limited, as long as the ratio exceeds 0%, but is preferably 10% or more, and further preferably 15% or more from a viewpoint of achievement of size reduction. An upper limit thereof is not particularly limited, as long as the thinnest thermoplastic resin layer can be formed, and is practically 40%.

In the present invention, the reason why the total thickness reduction ratio is preferably 10% or more is in achieving the size reduction and high efficiency of the electrical equipment. Specifically, in the case where the total thickness reduction ratio reaches 10%, it is found that the space factor is improved by about 3% and output density is improved by about 1.2%. Thus, if the output density can be improved by 1%, a beneficial effect is obtained in recent electrical equipment in which a high function and high performance have been achieved. Moreover, thus, not only the size reduction can be achieved, but also a new function can be incorporated thereinto.

As mentioned above, in the present invention, in order to enhance the withstand voltage properties, namely insulation performance, the thermoplastic resin covering (B) is not thickened, but conversely thinned. Thus, the size reduction can be achieved while the withstand voltage properties are maintained.

Moreover, in an embodiment in which the thermoplastic resin layer is laminated in the thermoplastic resin covering (B), the layer may be laminated in any manner, as long as the embodiment is applied in which the thermoplastic resin layers adjacent to each other are formed into the layer formed of the thermoplastic resins different from each other.

In the present invention, at least one of the thermoplastic resin layers is a thermoplastic resin layer (referred to as a PEEK layer in several cases) formed of polyether ether ketone or modified polyether ether ketone. This PEEK layer and the thinnest thermoplastic resin layer having a specific thickness interact, resulting in further enhancement in the effect on improving the withstand voltage properties of the thermoplastic resin covering (B) to be able to increase the total thickness reduction ratio while the withstand voltage properties are maintained, and be able to improve the heat resistance and the scratch resistance, which has been unable to be realized so far.

An outermost layer to be formed on an outermost side of the thermoplastic resin covering (B) is preferably the PEEK layer. In the case where the PEEK layer is formed as the outermost layer, the heat resistance of the insulated wire is superb.

Moreover, the thinnest thermoplastic resin layer is preferably provided inside the PEEK layer. Thus, the PEEK layer is not the thinnest thermoplastic resin layer, and the scratch resistance is improved. Here, in the case where the thermoplastic resin covering (B) has a plurality of PEEK layers, the thinnest thermoplastic resin layer is provided inside the PEEK layer formed on the outermost side.

The resin to be used in the thermoplastic resin layer is the thermoplastic resin, and above all, the thermoplastic resin having excellent heat resistance and chemical resistance is preferable.

Examples of the thermoplastic resin which can be used for the present invention include: general-purpose engineering plastics such as polyamide (also referred to as nylon), polyacetal (POM), polycarbonate (PC), polyphenylene ether (PPE, including a modified polyphenylene ether), syndiotactic polystyrene resin (SPS), polybutylene terephthalate (PBT), polyethylene terephthalate (PET), polyethylene naphthalate (PEN), and ultrahigh molecular weight polyethylene; and in addition, super engineering plastics such as polyetherimide (PEI), polyphenylsulfone (PPSU), polysulfone (PSU), polysulfone (PSF), polyether sulfone (PES), polyphenylene sulfide, polyarylate (PAR), polyether ketone (PEK), polyarylether ketone (PAEK), tetrafluoroethylene/ethylene copolymer (ETFE), polyether ether ketone (PEEK), modified PEEK, polyether ketone ketone (PEKK), tetrafluoroethylene/perfluoalkylvinylether copolymer (PFA), polytetrafluoroethylene (PTFE), a thermoplastic polyimide resin (TPI), thermoplastic polyamideimide (PAI), and a liquid crystal polyester; and further polymer alloys containing the foregoing engineering plastics such as a polymer alloy composed of polyethylene terephthalate (PET) or polyethylene naphthalate (PEN) as a base resin, ABS/polycarbonate, NYLON 6,6, aromatic polyamide resin, polyphenylene ether/NYLON 6,6, polyphenylene ether/polystyrene, and polybutylene terephthalate/polycarbonate. In the present invention, from the viewpoints of heat resistance and stress crack resistance, polyphenylene sulfide (PPS), polyether ketone ketone (PEKK), polyether ketone ketone (PEKK), polyarylether ketone (PAEK) (including modified PEEK), and polyether ether ketone (PEEK) may be preferably used in particular. These thermoplastic resins may be used singly or in combination thereof. Further, it is needless to say that the resin to be used is not limited by the above-described resin names, and resins other than those recited above also can be used, as long as they are superior in performance to those resins.

Specific examples of PEEK include commercially available products such as KetaSpire KT-820 (trade name, manufactured by Solvay Specialty Polymers K.K.), PEEK450G (trade name, manufactured by Victrex Japan Inc.). Specific examples of modified PEEK include commercially available products of AVASPIRE AV-650 (trade name, manufactured by Solvay Specialty Polymers K.K.). Specific examples of modified TPI include commercially available products of AURUM PL 450C (trade name, manufactured by Mitsui Chemicals, Inc.). Specific examples of modified PPS include commercially available products such as FORTRON 0220A9 (trade name, manufactured by Polyplastics Co., Ltd.), and PPS FZ-2100 (trade name, manufactured by DIC Corporation). Specific examples of modified SPS include commercially available products of XAREC S105 (trade name, manufactured by Idemitsu Kosan Co., Ltd.). Specific examples of modified thermoplastic PA include commercially available products such as FDK-1 (trade name, NYLON 6,6, manufactured by UNITIKA LTD.), F-5000 (trade name, NYLON 4,6, manufactured by UNITIKA LTD.), ARLENE AE-420 (trade name, NYLON 6,T, manufactured by Mitsui Chemicals, Inc.), and GENESTOR N-1006D (trade name, NYLON 9,T, manufactured by KURARAY CO., LTD.).

Examples of the modified PEEK include PEEK-based PPS, PES, PPSU or PEI polymer alloys and, for example, trade name: AVASPIRE AV-621, AV-630, AV-651, AV-722, AV-848, and the like, manufactured by Solvay Specialty Polymers K.K., can be used.

Specific examples of PES include commercially available products such as SUMIKA EXCEL 4800G (trade name, manufactured by Sumitomo Chemical Co., Ltd.), PES (trade name, manufactured by Mitsui Chemicals, Inc.), ULTRAZONE E (trade name, manufactured by BASF Japan Ltd.), and RADEL A (trade name, manufactured by Solvay Advanced Polymers Co.).

Specific examples of PPE include commercially available products such as XYRON (trade name, manufactured by Asahi Kasei Chemicals Corp.) and IUPIACE (trade name, manufactured by Mitsubishi Engineering Plastics Corp.).

Specific examples of PSU include a commercially available product of RADEL PSU (trade name, manufactured by Solvay Advanced Polymers Co.).

Specific examples of PEI include a commercially available product of ULTEM 1010 (trade name, manufactured by SABIC Innovative Plastics Holding BV).

Examples of PPSU include a commercially available product of RADEL R5800 (trade name, manufactured by Solvay Advanced Polymers Co.).

Specific examples of PAR include a commercially available product of U polymer U-100 (trade name, manufactured by Unitika Ltd.).

It is needless to say that the resin to be used is not limited by the above-described resin names, and resins other than those recited above also can be used, as long as they are superior in performance to those resins.

In the thermoplastic resin layer other than the PEEK layer, a resin other than PEEK and modified PEEK among the above-described thermoplastic resins can be used without any particular limitation.

For example, the thinnest thermoplastic resin layer is preferably a layer formed of an amorphous thermoplastic resin, and the thermoplastic resin layer other than the above thermoplastic resin layer is preferably a layer formed of a crystalline thermoplastic resin. In the present invention, the term "crystalline" means a property of capable of having a regularly provided crystalline structure in at least a part of the polymer chain. On the other hand, the term "non-crystalline" means to maintain an amorphous condition which has almost no crystalline structure and means such a property that the polymer chain becomes a random condition in curing.

Among above-described thermoplastic resins, examples of non-crystalline thermoplastic resins include polyether sulfone, polysulfone, polyphenylene ether, polyetherimide, polyphenyl sulfone, and polyarylate.

Among above-described thermoplastic resins, examples of crystalline thermoplastic resins include: general-purpose engineering plastics such as polyamide, polyacetal, polybutylene terephthalate, polyethylene terephthalate, and ultra-high molecular weight polyethylene; and a syndiotactic polystyrene re sin, polyphenylene sulfide, polyether ketone, polyarylether ketone, polyether ketone ketone, and a thermoplastic polyimide resin.

Above all, a syndiotactic polystyrene resin, polyphenylene sulfide, polyarylether ketone, polyether ketone ketone, polyamide (particularly nylon 6,6), polyether ketone, or a thermoplastic polyimide resin is preferable in view of high heat resistance (a melting point equal to or higher than 250° C.).

Regarding the thermoplastic resin which forms each thermoplastic resin layer, one kind may be used alone, or two or more kinds may be used in mixture.

In the case where more than one kind of thermoplastic resin are used in mixture, for example, both resins can be used by subjecting them to polymer alloy thereby making a compatible type uniform mixture, or can be used by forming a non-compatible blend into a compatible state with a compatibilizing agent.

In the present invention, the above-mentioned various additives may be contained in a raw material from which the thermoplastic resin layer is obtained within the range in which properties are not influenced. Furthermore, a layer formed from a resin containing these additives may be laminated on the resulting insulated wire, or the insulated wire may be coated with a coating material containing these additives.

The total thickness of the thermoplastic resin layer, namely the thickness of the thermoplastic resin covering (B) is 60 to 120 µm. In the case where the total thickness is less than 60 µm, the effect on improving the withstand voltage properties by the thinnest thermoplastic resin layer can be expected, but the withstand voltage properties of the thermoplastic resin covering (B) as a whole are originally low in several cases. On the other hand, in the case where the total thickness exceeds 120 µm, the effect on improving the withstand voltage properties by the thinnest thermoplastic resin layer is small, and for example, the total thickness reduction ratio (%) of the thermoplastic resin covering (B) does not reach 10%, and the withstand voltage properties are reduced in several cases. Moreover, the space factor is reduced, and size reduction of the electrical equipment cannot be achieved in several cases. The total thickness is further preferably 60 to 100 µm in view of a capability of satisfying both the withstand voltage properties and the space factor at a high level.

The thinnest thermoplastic resin layer among the thermoplastic resin layers has a layer thickness of 5 to 20 µm. In the case where the layer thickness is less than 5 µm, the effect on improving the withstand voltage properties is excellent, and the total thickness of the thermoplastic resin covering (B) can be decreased, which has problems of difficulty in uniformly molding this thermoplastic resin layer, and of easily causing defects. On the other hand, in the case where the layer thickness exceeds 20 µm, the effect on improving the withstand voltage properties is low, and for example, the total thickness reduction ratio (%) of the thermoplastic resin covering (B) does not reach 10%, and the withstand voltage properties are reduced in several cases.

The above-described layer thickness is further preferably 5 to 15 µm in view of a superb effect on improving the withstand voltage properties.

A thickness of the thermoplastic resin layer other than the thinnest thermoplastic resin layer among the thermoplastic resin layers is appropriately selected depending on the layer thickness of the thinnest thermoplastic resin layer, the number of the thermoplastic resin layers, and the like within the range in which the total thickness of the thermoplastic resin covering (B) is satisfied.

For example, in the case where the thickness of the outermost layer is 50 µm or more, the scratch resistance is excellent. The thickness of the outermost layer is set in the range in which the layer thickness does not exceed 120 µm, and is 115 µm or less, for example.

In particular, the thermoplastic resin covering (B) preferably has the PEEK layer, the total thickness is preferably 100 µm or less, and further the thickness of the thinnest thermoplastic resin layer is preferably 5 to 15 µm.

<Insulation Layer (C)>

In the present invention, an insulation layer may be provided between the conductor and the thermosetting resin layer. This insulating layer is a layer for insulating the conductor, and is not particularly limited, as long as the layer is the insulting layer (referred to as any other insulating layer) other than the thermosetting resin covering (A) and the thermoplastic resin covering (B). As the resin that forms the insulating layer (C), any kind of resin may be used, as long as the resin causes no poor appearance during baking the resin varnish or causes no significant reduction of the adhesion with the conductor 11 and with the thermosetting resin covering (A). The insulating layer (C) is formed of the thermoplastic resin such as polyurethane and polyester as such a resin, for example.

The conductor 11 on which the insulating layer (C) is formed is referred to as a covering conductor wire in several cases, and particularly the conductor having the insulating layer (C) formed of polyurethane is referred to as a polyurethane wire in several cases.

<Properties of an Insulated Wire>

The insulated wire of the present invention is excellent in the withstand voltage properties, the heat resistance and the scratch resistance.

For example, the insulated wire of the present invention preferably has 12 kV or more in an energizing voltage between the conductor and aluminum foil provided on the thermoplastic resin layer in the outermost layer in the withstand voltage properties measured as described below by using a dielectric break-down tester.

Specifically, the aluminum foil is wound around each part having 300 mm in a length of the insulated wires, one side of an electrode from which a terminal is peeled is connected to the conductor, and the other side is connected to the aluminum foil. Here, voltage is boosted at a voltage boosting speed of 500 V/sec, and the voltage when an electric current of 15 mA or more passes is read. The test is conducted at N=5, and the voltage is obtained by measuring a mean voltage.

<<Method of Producing an Insulated Wire>>

The insulated wire of the present invention can be produced by sequentially forming, on the periphery of the conductor, the insulating layer (C), if desired, the thermosetting resin covering (A), and the thermoplastic resin covering (B).

The insulating layer (C) can be formed by applying, on the periphery of the conductor, the resin and baking it.

The thermosetting resin covering (A) is provided by forming the thermosetting resin layer. The thermosetting resin layer is formed by applying, on the conductor or the insulating layer (C), the resin varnish and baking it. The method of coating the resin varnish may be in a usual manner. Examples of the coating method include a method of employing a die for a varnish coating, which has been manufactured so as to be similar to the shape of the conductor, and a method of employing a die that is called "universal die", which has been formed in a curb shape when the cross-section shape of the conductor is quadrangular.

The conductor having the resin varnish coated thereon is baked by a baking furnace in a usual manner. Although specific baking conditions depend on the shape of a furnace to be used, in the case where the furnace is an about 5 m-sized vertical furnace by natural convection, the baking can be achieved by setting the passing time period to 10 to 90 sec at the furnace temperature of 400 to 650° C.

The baking of the resin varnish may be performed once, but is ordinarily preferably repeated several times. When the baking is repeated several times, both identical baking conditions and different baking conditions are acceptable.

Thus, one layer of the thermosetting resin layer can be formed. In the case where a plurality of layers of the thermosetting resin layers is formed, the resin varnish to be used only needs to be replaced.

Subsequently, the thermoplastic resin covering (B) is provided on the outer periphery of the conductor on which the thermosetting resin covering (A) is formed.

The thermoplastic resin covering (B) can be provided by sequentially or simultaneously forming two or more thermoplastic resin layers.

For example, the thermoplastic resin covering (B) can be provided by co-extruding the conductor on which the thermosetting resin covering (A) is formed (also referred to as the enameled wire), and one kind of thermoplastic resin by using a co-extruder to form one layer of the thermoplastic layer, and sequentially extruding a different kind of thermoplastic resin thereon in a similar manner. In the case where the existing thermoplastic resin layer is formed of the amorphous thermoplastic resin, the thermoplastic resin covering (B) is preferably formed by extruding a different kind of thermoplastic resin that is formed into a melting state at a temperature higher than a glass transition temperature of the amorphous thermoplastic resin, and bringing the thermoplastic resin into contact with the existing thermoplastic resin layer to cause thermal fusion thereof.

Moreover, the thermoplastic resin covering (B) can also be formed at one stroke by performing multicolor extrusion molding of a plurality of kinds of thermoplastic resins onto the enameled wire by using a multicolor extruder.

In addition, the thermoplastic resin layer can also be formed by using an organic solvent or the like and the thermoplastic resin.

When the amorphous thermoplastic resin is used, the thermoplastic resin covering (B) can also be formed by coating the varnish in which the resin has dissolved in the organic solvent or the like on the enameled wire by using a die having a shape similar to the shape of the conductor, and baking the coated varnish, in addition to the extrusion molding.

As the organic solvent for the varnish, the organic solvents exemplified in the above-described resin varnish are preferable.

Moreover, the specific baking conditions, although the conditions depend on the shape of the furnace to be used and the like, are preferably conditions described in the conditions in the thermosetting resin covering (A).

The insulated wire of the present invention is applicable to a field which requires resistance to voltage and heat resistance, such as various kinds of electric equipment, preferably as coil formed by winding processing the wire. For example, the insulated wire of the present invention is used for a motor, a transformer and the like, which can compose high-performance electric equipment by being processed into a coil. In particular, the insulated wire is preferably used as a winding for a driving motor of HV and EV. As just described, the present invention can provide electric equipment, particularly a driving motor of HV and EV, equipped with a coil formed by winding processing the insulated wire. Meanwhile, in the case where the insulated wire of the present invention is used for a motor coil, it is also called an insulated wire for the motor coil.

In particular, the insulated wire having the above-described performance according to the present invention is preferably used as a winding wire for a driving motor of HV or EV in which achievement of size reduction and high performance has been recently significant.

EXAMPLES

The present invention will be described in more detail based on examples given below, but the invention is not meant to be limited by these.

Example 1

In this example, an insulated wire 1 shown in FIG. 1 was produced.

As the conductor 11, a cross-section rectangular (long side 3.2 mm×short side 2.4 mm, curvature radius of chamfered edge at four corners r=0.3 mm) conductor (copper having an oxygen content of 15 ppm) was used.

In the formation of the thermosetting resin covering (A) 12, a die having a shape similar to a shape of the thermosetting resin covering (A) formed on the conductor 11 was used. A 35 µm-thick thermosetting resin layer was formed by coating a polyamideimide resin (PAI) varnish (trade name: HI406, manufactured by Hitachi Chemical Co., Ltd.) on the conductor 11 by using the above-described die, and passing the resultant coated conductor through a baking furnace set at a furnace temperature of 550° C. and having a furnace length of 8 m at a speed at which the passing time became 15 seconds, and repeating the operations several times. Thus, an enameled wire having the thermosetting resin covering (A) 12 was obtained.

Subsequently, a varnish was prepared by dissolving PEI (trade name: ULTEM 1010, manufactured by SABIC Innovative Plastics Holding BV) into NMP.

Then, 15 µm-thick thermoplastic resin layer 14A formed of PEI was obtained by coating this varnish on the enameled wire by using a die having a shape similar to a shape of the conductor 11, and passing the coated enameled wire through a baking furnace set at 450° C. and having a furnace length of 8 m at a speed at which the passing time became 15 seconds. Thus, an enameled wire with the thermoplastic resin layer 14A was obtained.

A PEEK layer was formed outside the thermoplastic resin layer 14A by using the obtained enameled wire as a core wire, and using the extruder. The extruder had a 30 mm full-flight screw, in which L/D=20 and a compression ratio was adjusted to 3. A 50 µm-thick thermoplastic resin layer 14B was formed by extruding polyether ether ketone (trade name: KetaSpire KT-820, manufactured by Solvay Specialty Polymers K.K.) outside the thermoplastic resin layer 14A by using an extrusion die enabling the outer shape of a cross-section of the thermoplastic resin layer 14B to be similar to the shape of the conductor 11, and performing extrusion covering of PEEK at 400° C. (temperature of the extrusion die, the same shall apply hereinafter). Thus, an insulated wire 1 having the thermoplastic resin covering (B) 13A with a double-layered structure was obtained.

Example 2

In this example, an insulated wire 1 shown in FIG. 1 was produced.

An enameled wire having a thermosetting resin covering (A) 12 was obtained by forming a 30 µm-thick thermosetting resin layer in the same manner as Example 1 except that a polyimide resin varnish (trade name: U imide, manufactured by Unitika Ltd.) was used in place of the polyamideimide resin varnish in Example 1.

Next, a varnish was prepared by dissolving PES (trade name: SUMIKA EXCEL 4800G, manufactured by Sumitomo Chemical Co., Ltd.) into NMP.

Then, 5 µm-thick thermoplastic resin layer 14A formed of PES was obtained by coating this varnish on the enameled wire by using a die having a shape similar to a shape of the conductor 11, and passing the coated enameled wire through a baking furnace set at 450° C. and having a furnace length of 8 m at a speed at which the passing time became 15 seconds. Thus, an enameled wire with the thermoplastic resin layer 14A was obtained.

An insulated wire 1 having a thermoplastic resin covering (B) 13A with a double-layered structure was obtained by forming a 60 µm-thick thermoplastic resin layer 14B formed of PEEK outside the thermoplastic resin layer 14A in a manner similar to Example 1.

Example 3

In this example, an insulated wire 1 shown in FIG. 1 was produced.

An enameled wire having a thermosetting resin covering (A) 12 was obtained by forming a 30 µm-thick thermosetting resin layer in the same manner as Example 1 except that a Class H polyester (HPE) polyester varnish (trade name: Isone 1200, manufactured by Schenectady International Inc.) was used in place of the polyamideimide resin varnish in Example 1.

Next, a varnish was prepared by dissolving PPSU (trade name: RADEL R5800, manufactured by Solvay Advanced Polymers Co.) into NMP.

Then, 10 µm-thick thermoplastic resin layer 14A formed of PPSU was obtained by coating this varnish on the enameled wire by using a die having a shape similar to a shape of the conductor 11, and passing the coated enameled wire through a baking furnace set at 450° C. and having a furnace length of 8 m at a speed at which the passing time became 15 seconds. Thus, an enameled wire with the thermoplastic resin layer 14A was obtained.

A 70 µm-thick thermoplastic resin layer 14B was formed outside the thermoplastic resin layer 14A by using modified polyether ether ketone (trade name: AveSpire AV-651, manufactured by Solvay Specialty Polymers K.K.) in place of the polyether ether ketone (trade name: KetaSpire KT-820, manufactured by Solvay Specialty Polymers K.K.) in Example 1. Thus, an insulated wire 1 having a thermoplastic resin covering (B) 13A with a double-layered structure was obtained.

Example 4

In this example, an insulated wire 3 shown in FIG. 3 was produced.

An enameled wire having a thermosetting resin covering (A) 12 was obtained by forming a 25 µm-thick thermosetting resin layer in a manner similar to Example 2.

An enameled wire having a thermoplastic resin layer 14E was obtained by forming a 40 µm-thick thermoplastic resin layer 14E formed of PEEK outside the enameled wire in a manner similar to Example 1.

Next, an enameled wire with a thermoplastic resin layer 14F was obtained by forming a 10 μm-thick thermoplastic resin layer 14F formed of PES by coating a varnish in which PES has dissolved into NMP on the enameled wire having the thermoplastic resin layer 14E in a manner similar to Example 2.

Furthermore, 40 μm-thick thermoplastic resin layer 14G formed of PEEK was formed outside the thermoplastic resin layer 14F in a manner similar to Example 1. Thus, an insulated wire 3 having a thermoplastic resin covering (B) 13C with a triple-layered structure was obtained.

Example 5

In this example, an insulated wire 2 shown in FIG. 2 was produced.

An enameled wire having a thermosetting resin covering (A) 12 was obtained by forming a 30 μm-thick thermosetting resin layer in a manner similar to Example 1.

An enameled wire with a thermoplastic resin layer 14C was obtained by forming a 90 μm-thick thermoplastic resin layer 14C formed of PEEK outside the thermosetting resin covering (A) 12 in a manner similar to Example 1.

Next, a 15 μm-thick thermoplastic resin layer 14D formed of TPI was formed by extruding TPI (trade name: AURUM PL450C, manufactured by Mitsui Chemicals, Inc.) in place of the polyether ether ketone (trade name: KetaSpire KT-820, manufactured by Solvay Specialty Polymers K.K.) outside the thermoplastic resin layer 14C at 410° C. by using an extrusion die so as to enable the outer shape of a cross-section of the thermoplastic resin layer 14D to be similar to the shape of the conductor 11 in Example 1. Thus, an insulated wire 2 having the thermoplastic resin covering (B) 13B with a double-layered structure was obtained.

Example 6

In this example, an insulated wire 1 shown in FIG. 1 was produced.

An enameled wire having a thermosetting resin covering (A) 12 was obtained by forming a 30 μm-thick thermosetting resin layer in the same manner as Example 2.

A 20 μm-thick thermoplastic resin layer 14A was formed by extruding modified polyether ether ketone (trade name: AveSpire AV-651, manufactured by Solvay Specialty Polymers K.K.) in place of the polyether ether ketone (trade name: KetaSpire KT-820, manufactured by Solvay Specialty Polymers K.K.) outside the thermosetting resin covering (A) 12 at 400° C. in Example 1. Thus, an enameled wire with the thermoplastic resin layer 14A was obtained.

Next, a 90 μm-thick thermoplastic resin layer 14B formed of PEEK (trade name: KetaSpire KT-820, manufactured by Solvay Specialty Polymers K.K.) outside the thermoplastic resin layer 14A was formed in a manner similar to Example 1. Thus, an insulated wire 1 having the thermoplastic resin covering (B) 13A with a double-layered structure was obtained.

Comparative Example 1

In this example, an insulated wire having a thermoplastic resin covering formed of one layer of a thermoplastic resin layer was produced.

An enameled wire having a thermosetting resin covering was obtained by forming a 35 μm-thick thermosetting resin layer in the same manner as Example 1.

Then, an insulated wire having a thermoplastic resin covering with a single-layered structure was produced by forming a 70 μm-thick thermoplastic resin layer formed of PEEK (trade name: KetaSpire KT-820, manufactured by Solvay Specialty Polymers K.K.) outside the thermosetting resin covering in a manner similar to Example 1.

Comparative Example 2

In this example, an insulated wire having a thermoplastic resin covering formed of one layer of a thermoplastic resin layer was produced.

An enameled wire having a thermosetting resin covering was obtained by forming a 35 μm-thick thermosetting resin layer in a manner similar to Example 2.

Then, a 70 μm-thick thermoplastic resin layer formed of PEI was formed by extruding PEI (trade name: ULTEM 1010, manufactured by SABIC Innovative Plastics Holding BV) in place of the polyether ether ketone (trade name: KetaSpire KT-820, manufactured by Solvay Specialty Polymers K.K.) outside the thermosetting resin layer at 360° C. in Example 1. Thus, an insulated wire having the thermoplastic resin covering with a single-layered structure was obtained.

Comparative Example 3

In this example, an insulated wire having a thermoplastic resin covering formed of two layers of a thermoplastic resin layer was produced.

An enameled wire having a thermosetting resin covering was obtained by forming a 40 μm-thick thermosetting resin layer in a manner similar to Example 2.

Next, an enameled wire with a thermoplastic resin layer was obtained by forming a 20 μm-thick thermoplastic resin layer formed of PES in a manner similar to Example 2.

A 40 μm-thick thermoplastic resin layer formed of PA66 was formed by extruding NYLON 6,6 (referred to as PA66, trade name: FDK-1, manufactured by UNITIKA LTD.) in place of the polyether ether ketone (trade name: KetaSpire KT-820, manufactured by Solvay Specialty Polymers K.K.) outside the thermoplastic resin layer formed of PES at 300° C. in Example 1. Thus, an insulated wire having the thermoplastic resin covering with a double-layered structure was obtained.

Comparative Example 4

In this example, an insulated wire having a thermoplastic resin covering formed of two layer of a thermoplastic resin layer was produced.

An enameled wire having a thermosetting resin covering was obtained by forming a 25 μm-thick thermosetting resin layer in a manner similar to Example 2.

Next, an enameled wire with a thermoplastic resin layer was formed by extruding PPS (trade name: FZ-2100, manufactured by DIC Corporation) in place of PES outside the thermosetting resin layer at 320° C. to form 30 μm-thick thermoplastic resin layer in Example 2.

Then, a 30 μm-thick thermoplastic resin layer formed of PET was formed by extruding PET (trade name: TR8550, manufactured by Teijin Limited) in place of the polyether ether ketone (trade name: KetaSpire KT-820, manufactured by Solvay Specialty Polymers K.K.) outside the thermoplastic resin layer formed of PPS at 290° C. in Example 2. Thus, an insulated wire having the thermoplastic resin covering with a double-layered structure was obtained.

Comparative Example 5

In this example, an insulated wire having a thermoplastic resin covering formed of two layer of a thermoplastic resin layer was produced.

An enameled wire having a thermosetting resin covering was obtained by forming a 35 µm-thick thermosetting resin layer in the same manner as Example 1.

Next, an enameled wire with a thermoplastic resin layer was obtained by forming a 30 µm-thick thermoplastic resin layer formed of PEI outside the thermosetting resin layer in a manner similar to Example 1.

Then, a 30 µm-thick thermoplastic resin layer formed of PEEK (trade name: KetaSpire KT-820, manufactured by Solvay Specialty Polymers K.K.) was formed outside the thermoplastic resin layer formed of PEI in a manner similar to Example 1. Thus, an insulated wire having the thermoplastic resin covering with a double-layered structure was obtained.

Comparative Example 6

In this example, an insulated wire having a thermoplastic resin covering formed of two layer of a thermoplastic resin layer was produced.

An enameled wire having a thermosetting resin covering was obtained by forming a 25 µm-thick thermosetting resin layer in a manner similar to Example 2.

An enameled wire with a thermoplastic resin layer was obtained by forming a 5 µm-thick thermoplastic resin layer formed of PPSU in a manner similar to Example 3.

Then, a 40 µm-thick thermoplastic resin layer formed of PEEK (trade name: KetaSpire KT-820, manufactured by Solvay Specialty Polymers K.K.) was formed outside the thermoplastic resin layer formed of PPSU in a manner similar to Example 1. Thus, an insulated wire having the thermoplastic resin covering with a double-layered structure was obtained.

Comparative Example 7

In this example, an insulated wire having a thermoplastic resin covering formed of two layer of a thermoplastic resin layer was produced. This Comparative Example 7 was executed under assumption of the invention described in Patent Literature 1.

An enameled wire having a thermosetting resin covering was obtained by forming a 20 µm-thick thermosetting resin layer in a manner similar to Example 1.

An enameled wire with a thermoplastic resin layer was obtained by forming a 5 µm-thick thermoplastic resin layer formed of PPSU in a manner similar to Example 3.

Then, a 40 µm-thick thermoplastic resin layer formed of PPS was formed by extruding PPS (trade name: FZ-2100, manufactured by DIC Corporation) in place of the PEEK outside the thermoplastic resin layer formed of PPSU at 320° C. in a manner similar to Example 1. Thus, an insulated wire having the thermoplastic resin covering with a double-layered structure was obtained.

Comparative Example 8

In this example, an insulated wire having a thermoplastic resin covering formed of two layer of a thermoplastic resin layer was produced. This Comparative Example 8 was executed under assumption of the invention described in Patent Literature 2.

An enameled wire having a thermosetting resin covering was obtained by forming a 40 µm-thick thermosetting resin layer in a manner similar to Example 1.

An enameled wire with a thermoplastic resin layer was obtained by forming a 5 µm-thick thermoplastic resin layer formed of PPSU in a manner similar to Example 3.

Then, a 115 µm-thick thermoplastic resin layer was formed by extruding PPS (trade name: FZ-2100, manufactured by DIC Corporation) in place of the PEEK outside the thermoplastic resin layer formed of PPSU at 320° C. in a manner similar to Example 1. Thus, an insulated wire having the thermoplastic resin covering with a double-layered structure was obtained.

Comparative Example 9

In this example, an insulated wire having a thermoplastic resin covering formed of one layer of a thermoplastic resin layer was produced.

An insulated wire having the thermoplastic resin covering with a single-layered structure was obtained in the same manner as Comparative Example 1 except that the thickness of the thermoplastic resin layer was changed to 75 µm in Comparative Example 1.

The following measurement and evaluations were carried out on the insulated wires each prepared as described above. The obtained results are described in the following Table 1 as a whole.

[Heat Resistance (200° C.)]

Heat resistance of the insulated wires each was evaluated by thermal aging properties. Specifically, with reference to "3. Thermal shock resistance (applied to enameled wires and tape winding wires)" in JIS C 3216-6 "Winding wires-Test method-Part 1: General," 1% elongated linear insulated wires each were left to stand in a high temperature bath at 220° C. for 500 hours, and then whether or not cracks occurred in the thermosetting resin covering (A) or the thermoplastic resin covering (B) was visually confirmed.

A case where no cracks were confirmable in both the thermosetting resin covering (A) and the thermoplastic resin covering (B) was regarded as passed, and expressed by "A," and a case where cracks were confirmable in the thermoplastic resin covering (B) was regarded as rejected, and expressed by "C."

Moreover, a case where no cracks were confirmable in both the thermosetting resin covering (A) and the thermoplastic resin covering (B) even after the wires were left to stand for a period exceeding 1,000 hours in the above-described high temperature bath in the same manner was regarded as particularly excellent, and expressed by "AA."

[Withstand Voltage Properties]

Withstand voltage properties of the insulated wires each were evaluated by measuring voltage by using a dielectric break-down tester.

Specifically, aluminum foil was wound around each part having 300 mm in a length of the insulated wires, and one side of an electrode from which a terminal was peeled was connected to the conductor, and the other side was connected to the aluminum foil. Voltage was boosted at a voltage boosting speed of 500 V/sec, and the voltage when an electric current of 15 mA or more passed was read. The test was conducted at N=5, and the properties were evaluated by a mean value thereof. A case where the mean value exceeded 12 kV was regarded as passed, and expressed by "A," and a case where the mean value was 12 kV or less was regarded as rejected, and expressed by "C."

[Scratch Resistance]

Scratch resistance of insulated wires each was evaluated by an abrasion resistance test. Specifically, with reference to "6. Abrasion resistance (applied to enameled round wires)" in JIS C 3216-6 "Winding wires-Test methods-Part 3: Mechanical properties," measurement was carried out on rectangular wires. A test specimen was scratched by using a needle to which continuously increasing force was applied. A case where maximum force with which a coating was able to withstand was 2,000 g or more was regarded as passed, and expressed by "A," a case where the maximum force was 2,500 g or more was regarded as particularly excellent, and expressed by "AA," and a case where the test was regarded as rejected was expressed by "C." Here, "with which the coating was able to withstand" means a state in which neither break nor exposure of a lower layer was found.

the other hand, the insulated wire in Comparative Example 1 has the thermoplastic resin covering formed of one 70 μm-thick PEEK layer. Ordinarily, as the thickness of the resin covering is more increased, the withstand voltage properties become more improved. However, while the insulated wire having the thicker thermoplastic resin covering in Comparative Example 1 is rejected, the insulated wire having the thinner thermoplastic resin covering in Example 1 is passed. Thus, the insulated wire having the thinnest PEI layer as the layer that constitutes the thermoplastic resin covering in Example 1 has no necessity of increasing the thickness of the thermoplastic resin covering (insulation covering) in order to improve the withstand voltage properties, and conversely can have a decreased thickness.

Moreover, it is found that, in the case where the thermoplastic resin covering (B) is formed as the double-layered structure containing the PEEK layer, and the thickness of the thermoplastic resin layer other than the PEEK layer

TABLE 1

| | | Example | | | | | |
|---|---|---|---|---|---|---|---|
| | | 1 | 2 | 3 | 4 | 5 | 6 |
| Thermosetting resin covering (A) | Resin | PAI | PI | HPE | PI | PAI | PI |
| | Thickness (μm) | 35 | 30 | 30 | 25 | 30 | 30 |
| Thermoplastic resin covering (B) | Resin | PEI | PES | PPSU | PEEK | PEEK | Modified PEEK |
| | Thickness (μm) | 15 | 5 | 10 | 40 | 90 | 20 |
| | Resin | PEEK | PEEK | Modified PEEK | PES | TPI | PEEK |
| | Thickness (μm) | 50 | 60 | 70 | 10 | 15 | 90 |
| | Resin | — | — | — | PEEK | — | — |
| | Thickness (μm) | — | — | — | 40 | — | — |
| | Total thickness (μm) | 65 | 65 | 80 | 90 | 105 | 110 |
| Heat resistance | | AA | AA | AA | AA | A | AA |
| Withstand voltage properties | | A | A | A | A | A | A |
| Scratch resistance | | AA | AA | AA | A | A | A |

| | | Comparative Example | | | | | | | | |
|---|---|---|---|---|---|---|---|---|---|---|
| | | 1 | 2 | 3 | 4 | 5 | 6 | 7 | 8 | 9 |
| Thermosetting resin covering (A) | Resin | PAI | PI | PI | PI | PAI | PI | PAI | PAI | PAI |
| | Thickness (μm) | 35 | 35 | 40 | 25 | 35 | 25 | 20 | 40 | 35 |
| Thermoplastic resin covering (B) | Resin | PEEK | PEI | PES | PPS | PEI | PPSU | PPSU | PPSU | PEEK |
| | Thickness (μm) | 70 | 70 | 20 | 30 | 30 | 5 | 5 | 5 | 75 |
| | Resin | — | — | PA66 | PET | PEEK | PEEK | PPS | PPS | — |
| | Thickness (μm) | — | — | 40 | 30 | 30 | 40 | 40 | 115 | — |
| | Resin | — | — | — | — | — | — | — | — | — |
| | Thickness (μm) | — | — | — | — | — | — | — | — | — |
| | Total thickness (μm) | 70 | 70 | 60 | 60 | 60 | 45 | 45 | 120 | 75 |
| Heat resistance | | AA | C | C | C | AA | AA | C | C | AA |
| Withstand voltage properties | | C | C | A | C | C | C | C | A | C |
| Scratch resistance | | AA | A | A | C | AA | A | A | A | AA |

As is obvious from Table 1, the insulated wires in Examples 1 to 6 in which the insulated wires have the thermoplastic resin coverings (B) with the above-described structures and the like were excellent in all of the heat resistance, the withstand voltage properties and the scratch resistance, even if the total thickness of thermoplastic resin covering (B) is small.

It is obvious that, in the insulated wires in Examples, the withstand voltage properties can be maintained even if the total thickness of the thermoplastic resin covering (B) is small, for example, in comparison between the insulated wire in Example 1 and the insulated wire in Comparative Example 1. That is, in the insulated wire in Example 1, the thermoplastic resin covering (B) has the thinnest thermoplastic resin layer 14A (15 μm) formed of PEI and the PEEK layer (thickness: 50 μm), and the total thickness is 65 μm. On decreases to a specific thickness, the withstand voltage properties are significantly improved.

For example, in comparison between Comparative Example 9 in which the total thickness of the thermoplastic resin covering (B) is 75 μm, and Example 1, the insulated wire in Example 1 is thinner by 10 μm in the total thickness of the thermoplastic resin covering (B) in comparison with the Comparative Example (the total thickness reduction ratio is 13.3% based on the thickness in Comparative Example 9). However, while the insulated wire having a larger total thickness in Comparative Example 9 was rejected in the withstand voltage properties, the insulated in Example 1 passed the withstand voltage properties. That is, it is found that, in Example 1, the total thickness of the thermoplastic resin covering (B) can be decreased by as much as 10% or more even with improved withstand voltage properties. In addition, this effect is not limited to PEEK, but is confirmed also in other thermoplastic resins.

Thus, in the insulated wire in Example 1, the space factor can be reduced while the withstand voltage properties are maintained, which can contribute to achievement of size reduction and high performance of the electrical equipment. In addition, with regard to Examples 2 to 6, an effect similar to the above-described effect in Example 1 can be obtained. The effects are exhibited in a similar manner even if the insulated wire is used as the winding wire for the driving motor of HV or EV in which achievement of size reduction and high performance has been recently significant.

In particular, in the insulated wires in Examples 1 to 3 in which the insulated wires have the thermoplastic resin coverings (B) with the double-layered structure having the PEEK layer, and the thinnest thermoplastic layer with the thickness of 5 to 15 μm, and the total thickness of 100 μm or less, the insulated wires simultaneously had the heat resistance, the withstand voltage properties and the scratch resistance at a higher level.

On the other hand, in the insulated wires in Comparative Examples 1 and 2 in which the thermoplastic resin coverings are formed of one layer of the thermoplastic resin, no withstand voltage properties were satisfied.

Moreover, in the insulated wires in Comparative Examples 2 and 3 in which the thermoplastic resin coverings have no PEEK layer, the heat resistance was insufficient.

In the insulated wire in Comparative Example 4 in which the thermoplastic resin covering has no PEEK layer and the thickness of the thinnest thermoplastic resin layer is larger than the thickness specified in the present invention, all of the heat resistance, the withstand voltage properties and the scratch resistance were rejected.

In the insulated wire in Comparative Example 5 in which the thickness of the thinnest thermoplastic resin layer that forms the thermoplastic resin covering is larger than the thickness specified in the present invention, even if the thermoplastic resin covering had the PEEK layer, the withstand voltage properties were rejected.

In the insulated wire in Comparative Example 6 in which the total thickness of the thermoplastic resin coting is smaller than the thickness specified in the present invention, even if the thermoplastic resin covering has the PEEK layer, no withstand voltage properties were satisfied.

In Comparative Example 7 in which the thermoplastic resin covering has no PEEK layer, and the total thickness of the thermoplastic resin covering is smaller than the total thickness specified in the present invention, neither the heat resistance nor the withstand voltage properties reached a passable level set in the present invention.

Moreover, in Comparative Example 8 in which the thermoplastic resin covering has no PEEK layer, even if the outermost layer is the thermoplastic resin layer formed of PPS, no heat resistance reached a passable level set in the present invention.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 to 3 Insulated wire
11 Conductor
12 Thermosetting resin covering
13A to 13C Thermoplastic resin covering
14A to 14G Thermoplastic resin layer

The invention claimed is:

1. An insulated wire, comprising a thermosetting resin covering (A), directly or by interposing an insulating layer (C), on a conductor having a rectangular cross-section, and a thermoplastic resin covering (B), as an extrusion covering, on a periphery of the thermosetting resin covering (A), wherein
   the thermoplastic resin covering (B) has at least two layers of the thermoplastic resin layers, and
   the thermoplastic resin layers adjacent to each other are formed of thermoplastic resins different from each other, at least one layer of the thermoplastic resin layers is formed of polyether ether ketone or modified polyether ether ketone, and a total thickness of the thermoplastic resin layers is 65 to 120 μM, and a thickness of a thinnest thermoplastic resin layer among the thermoplastic resin layers is 5 to 20 μm.

2. The insulated wire according to claim 1, wherein an outermost layer of the thermoplastic resin covering (B) is a thermoplastic layer formed of the polyether ether ketone or the modified polyether ether ketone.

3. The insulated wire according to claim 1, wherein the thermoplastic resin covering (B) is formed of two layers of the thermoplastic resin layers.

4. The insulated wire according to claim 1, wherein the thinnest thermoplastic resin layer is provided inside the thermoplastic resin layer formed of the polyether ether ketone or the modified polyether ether ketone.

5. A coil formed by winding processing the insulated wire according to claim 1.

6. Electronic/electrical equipment, having the coil according to claim 5.

7. The insulated wire according to claim 1, wherein the insulated wire comprises the insulating layer (C).

8. The insulated wire according to claim 7, wherein the insulating layer (C) comprises polyurethane.

9. The insulated wire according to claim 1,
   wherein an outermost layer of the thermoplastic resin covering (B) is a thermoplastic layer formed of the polyether ether ketone or the modified polyether ether ketone, and
   wherein the thermoplastic resin covering (B) is formed of two layers of the thermoplastic resin layers.

* * * * *